Aug. 12, 1958   M. R. HEPPNER   2,847,601
ION TRAP AND METHOD OF MAKING SAME
Filed Nov. 30, 1955
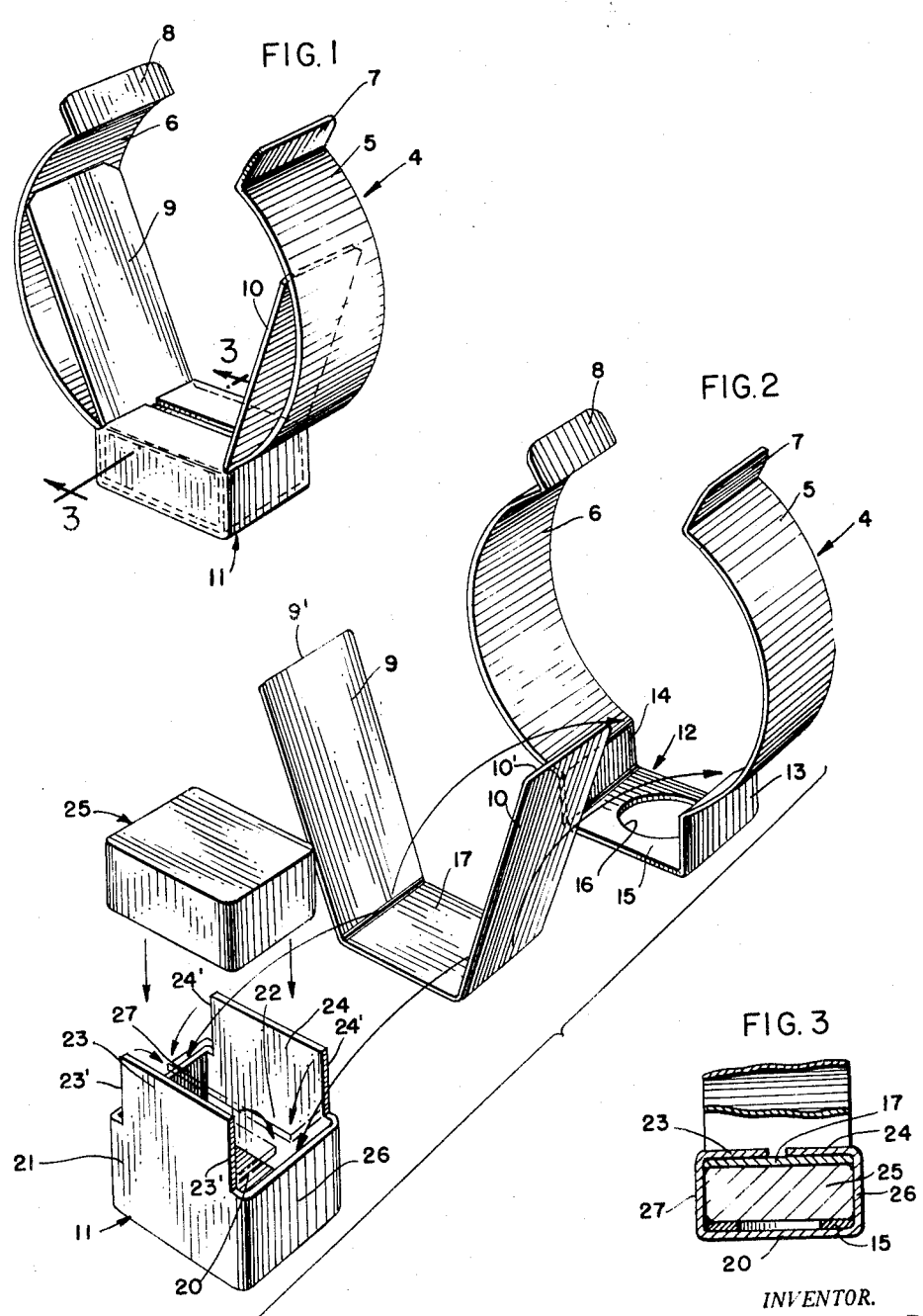
INVENTOR.
MYRON R. HEPPNER
BY Schroeder, Hofgren,
Brady and Wegner,
ATT'YS

United States Patent Office 2,847,601
Patented Aug. 12, 1958

2,847,601

ION TRAP AND METHOD OF MAKING SAME

Myron R. Heppner, Round Lake, Ill., assignor to Heppner Mfg. Co., a corporation of Illinois Application November 30, 1955, Serial No. 550,047

6 Claims. (Cl. 313—84)

This invention relates to an ion trap and its method of manufacture.

The particular ion trap with which this application is concerned is one intended for use with a cathode ray tube such as is commonly found in a television receiver.

The primary object of the invention is to provide a new and improved ion trap and method of assembling the same.

Another object is to provide a method of assembling an ion trap particularly adapted to automation.

Another object is to provide a method of assembling an ion trap requiring less die maintenance than heretofore.

Other features, objects and advantages of the present invention will be apparent from the following description of an embodiment illustrated in the drawings in which:

Figure 1 is a perspective view of the assembled ion trap of the present invention;

Figure 2 is an exploded perspective view of the parts of the ion trap illustrated in Figure 1 prior to their assembly; and Figure 3 is a fragmentary sectional view through the assembled ion trap taken substantially along line 3—3 in Fig. 1.

While this invention is susceptible of embodiments in many different forms, there is shown in the drawings and will herein be described in detail a specific embodiment, with the understanding that the present disclosure is to be considered as an exemplification of the principle of the invention and is not intended to limit the invention to the embodiment illustrated. The scope of the invention will be pointed out in the appended claims.

The ion trap is equipped with a frame permitting its attachment to the neck of a television receiver picture tube in such a manner that it may readily be moved circumferentially of the tube neck. The magnetic field of the trap is provided by a permanent magnet. The present invention provides a relatively simple yet effective structure for accomplishing the purpose of the ion trap as well as making the attachment thereof to the picture tube quite simple.

Referring to Figure 1, the trap is equipped with a frame generally indicated 4 which in essence is a spring clip having one leg 5 of generally arcuate configuration and an opposing leg 6 of similar configuration. The outer end portions 7 and 8 of the legs are turned upwardly for guiding the spring clip onto the neck of the picture tube. To prevent the spring clips from snapping the body of the trap onto the tube and breaking it, a Phosphor bronze cushion spring having legs 9 and 10 is mounted within the legs of the spring clip. The parts described above are all held in assembled relation within an aluminum cup-shaped retainer generally indicated 11.

The configuration of the separate parts of the ion trap is best seen from Figure 2. The frame 4 has an offset base portion 12 including a U-shaped portion having legs 13 and 14 joined by a flat base 15 so that the portion 12 is outwardly offset from the otherwise generally arcuate shape of the clip. An opening 16 is placed in the base 15 of the offset portion in order that the metal of the clip not interfere with the magnetic field of the permanent magnet.

The Phosphor bronze cushion spring has a base portion 17 joining its legs 9 and 10. Generally, the spring is of a width about the same as that of the spring clip 4. The outer ends 9' and 10' of the legs respectively are intended to rest against the inner surfaces of the spring clip frame member 4.

The cup-shaped retainer 11 is preferably made of an aluminum or aluminum alloy so that it is readily capable of forming in dies requiring little maintenance. The retainer has four side walls and a bottom 20 making a boxlike structure. Two of the side walls 21 and 22 are provided with upwardly extending lips 23 and 24. These lips or ear portions are used for holding the assembly together within the retainer.

The permanent magnet 25 is of block form and of a size to fit within the U-shaped base portion 12 of the spring clip and inside the retainer. The magnet may be made of various available materials, but is preferably made of a powdered ferric material known as ferrite.

The assembled relation of the parts is illustrated in Figures 1 and 3 wherein it will be noted that the magnet 25 is held captive between the base wall 15 of the spring clip and the base portion 17 of the Phosphor bronze cushion. Lateral movement of the magnet is prevented in one direction by the side walls 13 and 14 of the spring clip and in the other direction by the outer walls 26 and 27 of the retainer. The integral lips 23 and 24 of the retainer are turned inwardly over the assembled parts to clamp them against the bottom 20 thus holding all of the parts in assembled relation.

Each of the parts is formed prior to bringing them together in the final assembled product. The spring clip member may be placed in the retainer so that its legs 5 and 6 extend outwardly at the ends of the lips 23 and 24. It will be noted that the lips have outer edges 23' and 24' respectively which are offset inwardly from the joining side walls 26 and 27 so as to allow space for the legs of the spring clip to pass out of the retainer.

The next step in the assembly is to place the permanent magnet 25 within the base of the spring clip. It is temporarily held in place while the cushion spring is placed on top of the magnet. This nested arrangement is temporarily maintained until the integral lips on the cup retainer may be turned over and pressed downwardly against the parts. Once the lips are folded in over the nested parts, the retainer maintains the assembly parts in proper relative position. No fasteners are required in order to assemble the parts and the entire operation may be carried out without requiring the application of heat as is often the case with brazing, soldering or other fastening procedures.

The ion trap assembly resulting from following the present invention has a neat appearance and one that may be manufactured easily with the usual tools and machines required for mass production at high unit rates. The steps required to assemble the units may be easily set up in the machines since the parts themselves have some tendency to maintain the assembled relation until the final step of clamping the retainer about the parts. Thus the present ion trap may be produced by automation processes resulting in a lower per item cost.

I claim:

1. The method of assembling an ion trap, comprising: the steps providing a relatively wide C-shaped spring clip with a U-shaped outwardly offset base portion, nesting the base portion in an open retainer shaped to confine movement of the base laterally, nesting a permanent magnet in the offset base portion so as to be within the retainer to confine lateral movement of the magnet, and then turning a lip on the retainer over the nested base portion and magnet to hold them together in the retainer.

2. The method of assembling an ion trap, comprising: the steps of offsetting a portion of a C-shaped spring clip to form an outwardly extending base portion, nesting the clip base portion in a cup retainer shaped to receive the base, nesting a permanent magnet in the offset base portion then folding an integral lip on the retainer over the magnet and clip base to hold them in their nested relationship.

3. The method of assembling an ion trap, comprising: the steps, placing a base portion of a spring clip in an upwardly open cup-shaped retainer, positioning a permanent magnet in the base portion of the clip so as to be confined against lateral movement by the retainer walls in one direction and the clip base portion in a transverse direction, and then crimping a pair of integral ear portions on the retainer inwardly over the magnet holding the clip and magnet in assembled relation.

4. The method of assembling an ion trap, comprising: the steps of supporting an upwardly open cup-like retainer in position to receive parts of the trap, inserting a base portion of a spring clip in the retainer, nesting a permanent magnet within the retainer against the base of the spring clip, placing the base of a cushion spring over the magnet and holding the clip, magnet and cushion spring in said relationship while clamping an integral lip of the retainer over the assembly to bind the parts together.

5. The method of making an ion trap, comprising: the steps of providing a spring clip for holding the trap on the neck of a tube, offsetting a base portion of the clip outwardly therefrom for receiving a permanent magnet, placing the offset base portion in a cup-shaped retainer having upstanding ears, temporarily holding a permanent magnet in said base portion and a cushion member over the magnet and then forcing the ears downwardly against the cushion member clamping the clip, magnet and cushion in assembled relation between the ears and the bottom of the cup-shaped retainer.

6. An ion trap assembly, comprising: a generally cup-shaped retainer having a pair of integral ears on opposite sides, a spring frame having fingers for securing the assembly to a tube and a base portion reposing in the retainer, a permanent magnet in the retainer against the base portion of the frame, and a cushion member reposing on the magnet with lugs extending outwardly within the spring frame fingers, said ears extending inwardly of the retainer and against the cushion holding the frame, magnet and cushion in assembled relation.

References Cited in the file of this patent
UNITED STATES PATENTS

| | | |
|---|---|---|
| 2,522,872 | Heppner | Sept. 19, 1950 |
| 2,586,948 | Heppner | Feb. 26, 1952 |
| 2,663,815 | Mucher | Dec. 22, 1953 |